Figure 1:
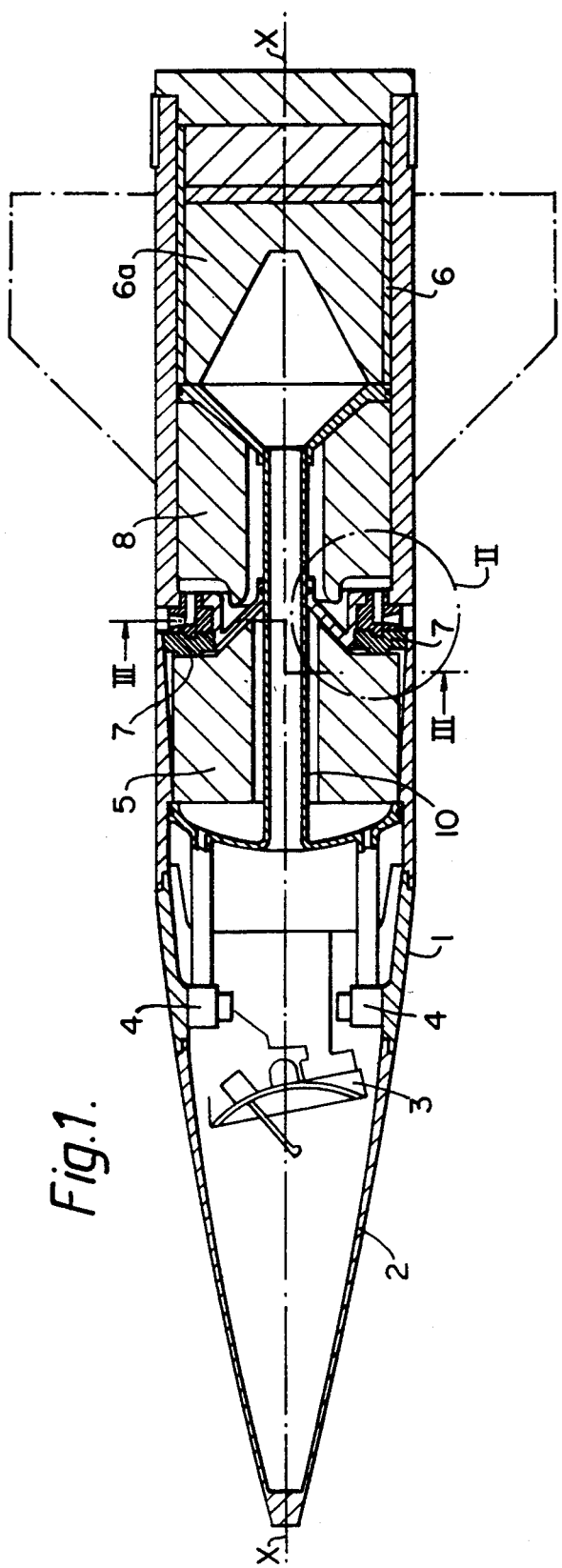

United States Patent [19]
Gaywood

[11] Patent Number: 5,386,951
[45] Date of Patent: Feb. 7, 1995

[54] SPIN RATE VARIATION OF SPINNING BODIES

[75] Inventor: John E. Gaywood, Stevenage, England

[73] Assignee: British Aerospace Public Limited Company, London, England

[21] Appl. No.: 788,550

[22] Filed: Jul. 11, 1985

[30] Foreign Application Priority Data

Jul. 11, 1984 [GB] United Kingdom ............... 8417706

[51] Int. Cl.⁶ ............................................. F42B 10/66
[52] U.S. Cl. .................................................. 244/3.22
[58] Field of Search ......................................... 244/3.22

[56] References Cited

U.S. PATENT DOCUMENTS

| | | | |
|---|---|---|---|
| 3,384,325 | 5/1968 | Hermann | 244/3.22 |
| 3,531,693 | 7/1971 | Raynaud et al. | 244/3.22 |
| 3,721,402 | 3/1973 | Holland | 244/3.22 |
| 4,589,594 | 5/1986 | Kranz | 244/3.22 |

Primary Examiner—Ian J. Lobo
Attorney, Agent, or Firm—Cushman, Darby & Cushman

[57] ABSTRACT

A projectile, which spins in flight about a spin axis, including a source of pressure fluid, efflux outlet means in flow connection with said source, the efflux outlet means comprising at least two nozzle members symmetrically spaced about the spin axis, each nozzle member being pivotally mounted on the projectile, and means responsive to the prevailing spin rate effective to pivot the nozzle members such that the effective radius centred upon the spin axis at which the thrust generated by the efflux from the nozzle members is operative can be varied whereby the torque applied to the projectile about the spin axis can be varied without the necessity of measuring the spin rate or effecting throttling of the efflux.

4 Claims, 3 Drawing Sheets

SPIN RATE VARIATION OF SPINNING BODIES

The invention relates to spinning bodies of the type in which the spin rate during flight is required to be varied. It has particular utility where a spin stabilised projectile requires to be de-spun or to have its spin rate reduced but, naturally, it is also applicable to cases where the rate is to be increased. The requirement for de-spinning occurs when a seeker head is activated to acquire the ground for subsequent down range manoeuvring.

It is known to vary the spin rate of bodies in flight by means of jet thrust imparted by thrusters so offset from the axis of spin that torque is imparted about said axis, but where that torque is required to be proportional to a prevailing spin rate (which may vary) it is often difficult or undesireable to add complication to achieve such a result. For example, some means of sensing spin rate must be provided as must some means of throttling the efflux.

Thus it is an object of the present invention to provide simple and effective spin rate varying means responsive to a prevailing rate of spin.

According to one aspect of the present invention, a body, for example a projectile, which spins in flight about a spin axis, includes a source of pressure fluid, efflux outlet means in flow connection with said source, the efflux outlet means comprising at least two nozzle members symmetrically spaced about the spin axis, each nozzle member being pivotally mounted on the body, and means responsive to the prevailing spin rate effective to pivot the nozzle members such that the effective radius centred upon the spin axis at which the thrust generated by the efflux from the nozzle members is operative can be varied. By this arrangement, the torque applied to the body about the spin axis can be varied without the necessity of measuring the spin rate or effecting throttling of the efflux.

Preferably each nozzle member is provided with a mass so offset from its pivot axis that the centre of gravity of each nozzle member is itself offset such that centrifugal force acting upon the centre of gravity effects rotation of the nozzle or about its pivot axis. In one embodiment a predetermined bias is arranged to act against the centrifugal force such that at a given spin rate the nozzle member adopts a given angle with respect to the body.

Where it is desired to effect a relatively constant torque upon the body irrespective of subsequent body spin rates, means are provided to lock each nozzle member at the angular position adopted in response to the initially prevailing spin rate.

Figure 2:
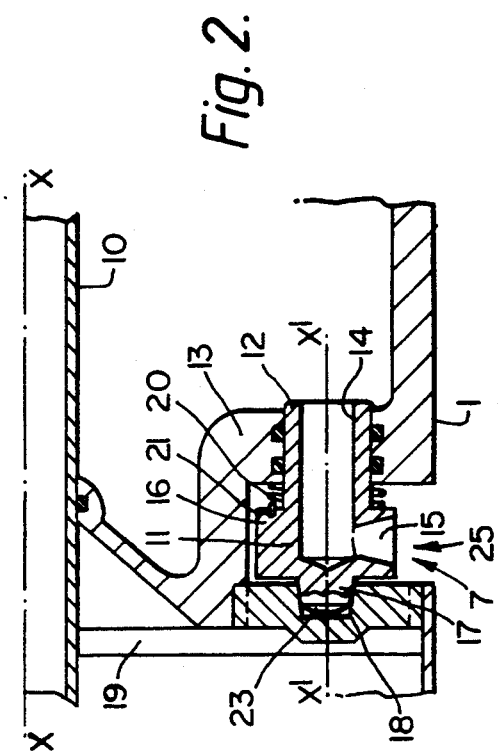
Figure 3:
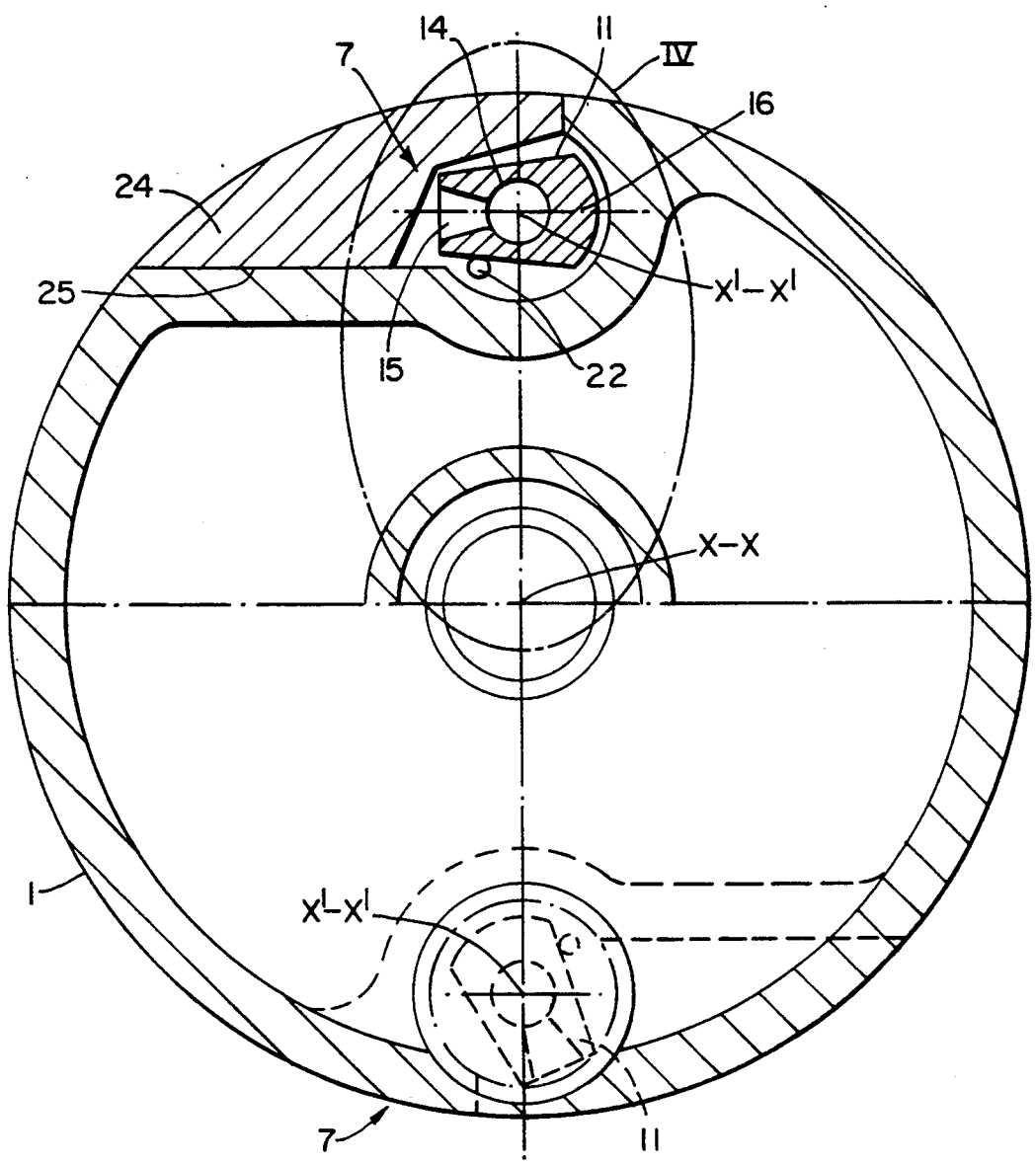
Figure 4:
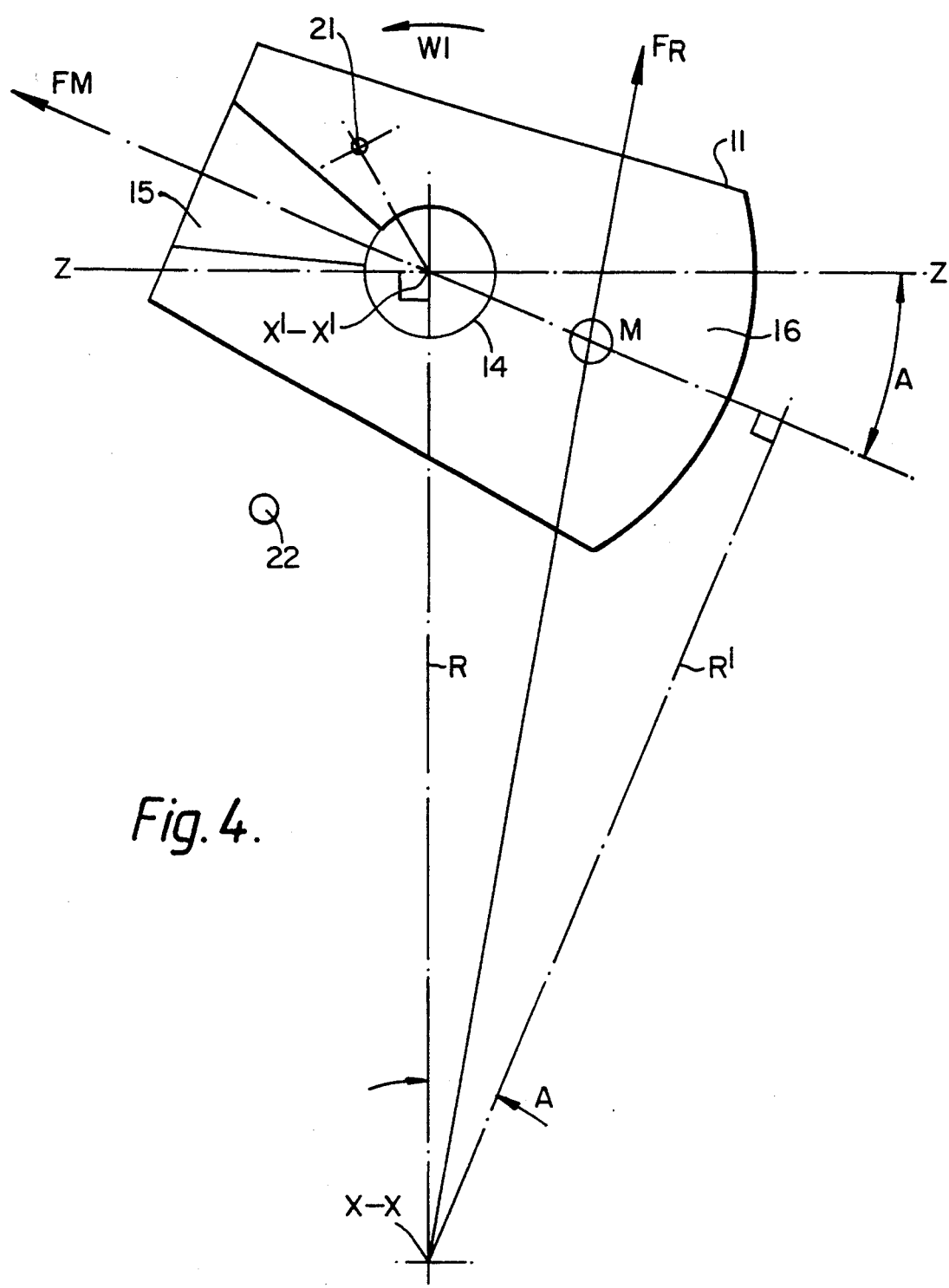

One example of the present invention is described by way of example with reference to the accompanying drawings in which:

FIG. 1 is a cross-sectional view of a projectile, the cross-section being taken upon the fore and aft axis of the projectile, that is to say the spin axis, FIG. 2 is an enlarged detailed view of that region II of FIG. 1, FIG. 3 is a similarly enlarged view being a cross-section upon line III—III—III of FIG. 1, and, FIG. 4 is a further enlarged view of that region of FIG. III bounded by IV.

A projectile suitable for launching from a gun has a body 1 housing a bay 2 containing a seeker head 3, down-range manoeuvre thrusters 4 powered by an annular charge 5, a warhead bay 6 containing a hollow-shaped charge 6a, and de-spin thrusters 7 powered by an annular charge 8.

A tubular member 10 extends longitudinally between the seeker head bay 2 and the warhead bay 6. The projectile has a fore and aft axis X—X about which it spins in flight.

In use, the projectile is spin-stabilised at rates up to 270 Hz but this spin rate has to be drastically reduced after a given time of flight (i.e. down range) to allow the seeker head 3 to acquire the ground. De-spin thrusters 7 are provided to effect this reduction in spin rate. These include a pair of nozzle members each one (11) of the pair being symmetrically and diametrically disposed from the axis X—X. Each member 11 comprises a spigot region 12 which is carried for both rotational and axial movement about and along an axis X'—X' lying parallel to the axis X—X by a generally transverse end wall 13 of a chamber containing the charge 8. The spigot region 12 protrudes into the chamber containing the charge 8. This region 12 has a duct 14 which, not only extends into the chamber, but also extends along the axis X'—X' and then turns through a right-angle to form a convergent-divergent nozzle 15. Naturally, as the member 11 rotates about the axis X'—X', the direction of any efflux from the nozzle 15 is angularly varied. Diametrically opposite the nozzle 15 is, integrally formed by the material of the nozzle member, a block 16 of carefully chosen mass. This ensures that the centre of gravity of the member 11 (the centre of gravity is referenced M in FIG. 4) is offset from the axis X'—X'.

Protruding from the opposite end of the member to that of the spigot 12 and formed co-axially with the spigot region and the axis X'—X' is a frusto-conical region 17 which, in addition to having a locating function achieved by mating with a tapered recess 18 in a further transverse wall region 19, provides a further function to be later described.

A coil spring 20 is arranged to lie around the spigot region 12 between the end wall 13 and the member 11. The ends of the spring respectively reside in axial recesses formed in the end wall (not shown) and the member (at 21) so that a torque is exerted on the member to effect its rotation with reference to the projectile body. The torque is selected so as to tend to urge the nozzle member in a clock-wise direction as shown in FIGS. 3 and 4, that is to say generally outwards from the body.

A peg 22 stops anti-clockwise rotation of the member at a position in which the nozzle 15 directs its efflux tangentially to a notional circle centred upon the axis X—X.

A disc spring 23 is provided between an end face of the frusto-conical region 17 and a base region of the recess 18. As can be seen, the members 11 are inset into the body and cut away regions 25 are therefore provided in the body to allow unrestricted tangential efflux flow. The cut away regions 25 and hence the members 11 are arranged to be covered by fairings 24 when in the tangential position. The fairings are conformal, that is to say they conform to the outer contour of the body when fitted.

With particular reference to FIG. 4, in use, the projectile is launched from a gun with its nozzle members 11 in the tangential position illustrated at the top half of FIG. 3. The conformal fairings 24 are in place and the projectile is spinning at a rate chosen to provide spin stability, say W1. This spin rate is anti-clockwise about the axis X—X. When spin rate reduction is necessary, the fairings 24 are removed and discarded and the nozzle members 11 are allowed to move clockwise away from the stops 22 under the action of the coiled springs 20 acting through points 21 spaced from the axes X'—X'. This action is countered by the centrifugal force FR exerted by the spin rate upon the members 11 whose centres of gravity M are spaced from the axes X'—X', thus tending to cause rotation of the nozzle members 11 in a counter-clockwise sense. The torques arranged to be acting upon the nozzle members are chosen such that at identical angular settings A with reference to the axes Z—Z, equilibrium positions are reached by each member, the settings A being dependent on the spin rate prevailing.

The charge 8 is then ignited and the fluid flowing through the nozzles 15 is such as to effect desired anti-spin torque acting about the axis X—X upon the body. The anti-spin torque is a function of the nozzle thrust (FM) and the cosine of the angle A, so that if the values of the mass of the members 11 and the positions of their centres of gravity M are correctly selected, it is possible to achieve cosine A approximately proportional to the spin rate W1.

As can be seen in FIG. 4, the effective radius at which the thrust generated by the efflux from the nozzles 15 is operative is shown at R when the nozzle members 11 are in the tengential position aligned with axes Z—Z, and at R' when the nozzle members 11 are in the equilibrium position, shown by the angles referenced A.

The corresponding reduction in the rate of spin would normally allow the nozzle members to rotate to a position in which their direction of thrust was even further away from the tangential position of maximum torque, so that unless the thrust was increased, anti-spin torque would progressively be reduced. Since it is undesireable to resort to such complications as variable thrust, an arrangement is provided such that irrespective of the subsequent spin rate the nozzle members remain in their original anti-torque position whilst fluid pressure is being developed. Thus it is arranged that the fluid pressure exerted upon each nozzle member 11 is such as to urge it axially against the bias of the disc springs 23 further into the recess 18 until wedging occurs. The nozzle members 11 are then locked at angle A for as long as fluid pressure exists.

In the example illustrated and described, an initial spin rate of 270 Hz (1700 rad/second) with a desired zero spin rate after two seconds, a total thrust from the nozzles must be of the order of 2000N.

I claim:

1. A body, which spins in flight about a spin axis, including a source of pressure fluid, efflux outlet means in flow connection with said source, the efflux outlet means comprising at least two nozzle members symmetrically spaced about the spin axis, each nozzle member being pivotally mounted on the body, and means responsive to the prevailing spin rate effective to pivot the nozzle members such that the effective radius centred upon the spin axis at which the thrust generated by the efflux from the nozzle members is operative can be varied whereby the torque applied to the body about the spin axis can be varied without the necessity of measuring the spin rate or effecting throttling of the efflux.

2. A body according to claim 1 wherein each nozzle member is provided with a mass so offset from its pivot axis that the centre of gravity of each nozzle member is itself offset such that centrifugal force acting upon the centre of gravity effects rotation of the nozzle member about its pivot.

3. A body according to claim 2 wherein bias means are provided to effect a predetermined bias arranged to act against the centrifugal force such that at a given spin rate the nozzle member adopts a given angle with respect to the body.

4. A body according to claim 3, wherein means are provided to lock each nozzle member at the angular position adopted in response to the initially prevailing spin rate so that a relatively constant torque is effected upon the body irrespective of subsequent body spin rates.

* * * * *